Jan. 26, 1926.

J. L. CROUCH 1,570,948

TEST FIXTURE

Filed August 27, 1923   2 Sheets-Sheet 1

Inventor:
James L. Crouch,
by Joel C. R. Palmer
Att'y

Jan. 26, 1926.  1,570,948

J. L. CROUCH

TEST FIXTURE

Filed August 27, 1923   2 Sheets-Sheet 2

Inventor:
James L. Crouch,
by [signature] Atty

Patented Jan. 26, 1926.

1,570,948

UNITED STATES PATENT OFFICE.

JAMES L. CROUCH, OF SUMMIT, NEW JERSEY, ASSIGNOR TO WESTERN ELECTRIC COMPANY, INCORPORATED, OF NEW YORK, N. Y., A CORPORATION OF NEW YORK.

TEST FIXTURE.

Application filed August 27, 1923. Serial No. 659,549.

*To all whom it may concern:*

Be it known that I, JAMES L. CROUCH, a citizen of the United States of America, residing at Summit, in the county of Union, State of New Jersey, have invented certain new and useful Improvements in Test Fixtures, of which the following is a full, clear, concise, and exact description.

This invention relates to test fixtures.

An object of this invention is to provide means for placing an electric winding of a plurality of turns around a body, such as a magnetic core.

In the manufacture of electric devices comprising magnetic cores, it is frequently desirable to test the characteristics of the cores before the permanent windings are wound thereon. This enables unsatisfactory cores to be discarded before any appreciable expense has been incurred in their manufacture into transformers, loading coils and the like.

In accordance with one form of this invention, a jig or test fixture is provided, which will, by the operation of a single lever, place an effective multi-turn winding around a toroidal core to be tested. The fixture briefly comprises a movable annular ring serving as a platform on which the toroidal core to be tested may be placed. This platform is adapted to be lowered between two circular rows of upright contact posts. At the time the platform is lowered, a plate having mounted thereon two circular rows of spring contact members is also lowered until the spring contacts engage the posts above referred to. The lower ends of the corresponding posts in the two rows may be permanently connected and the corresponding spring members in the two rows may be so connected that when contact is made between the spring members and the posts the magnetic core is enclosed in a uniformly distributed continuous winding of a plurality of turns. This effective winding may be employed, for example, as an arm of a Wheatstone bridge to determine various characteristics of the enclosed core material.

Figures 1, 2:
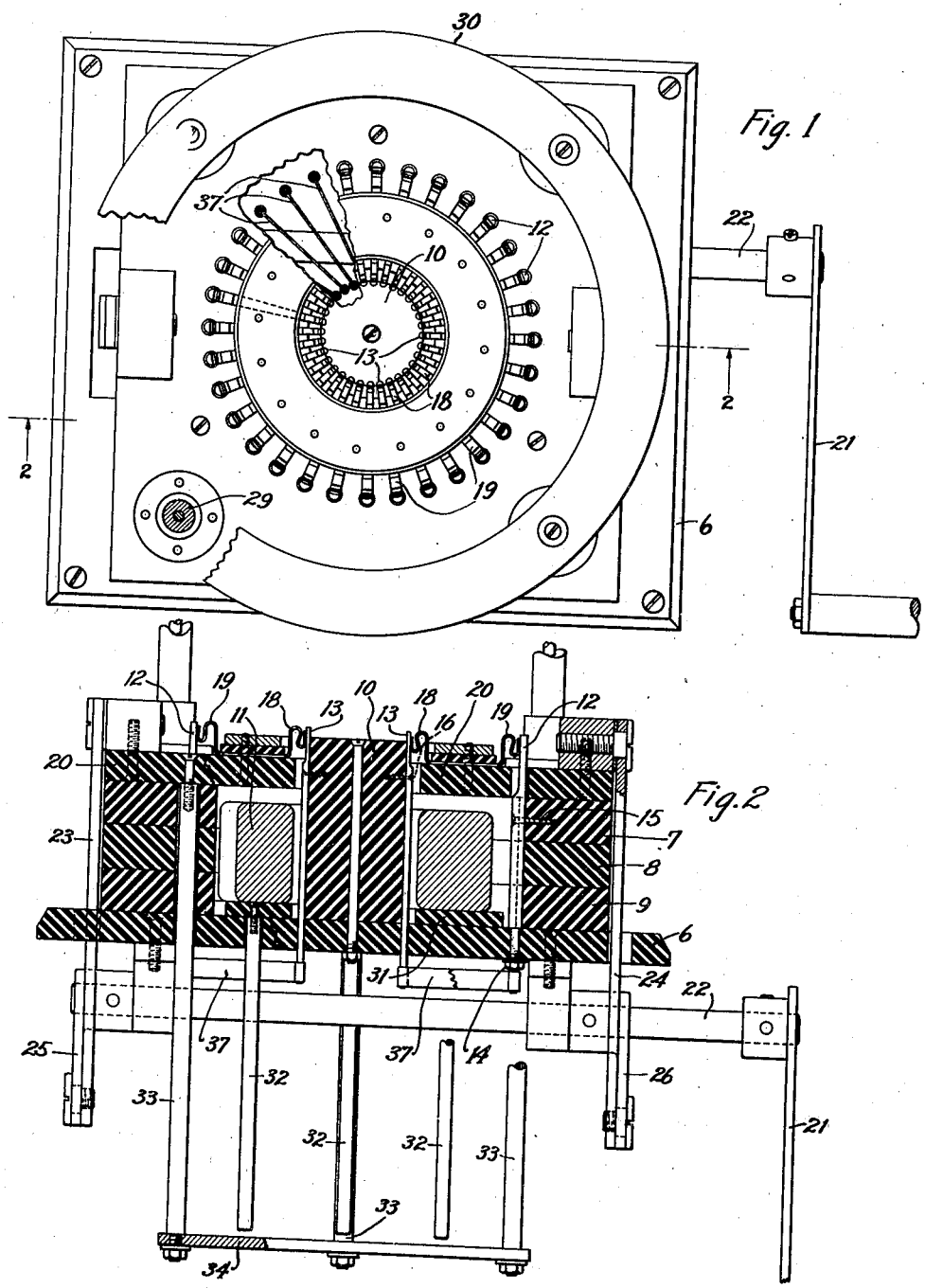
Figure 3:
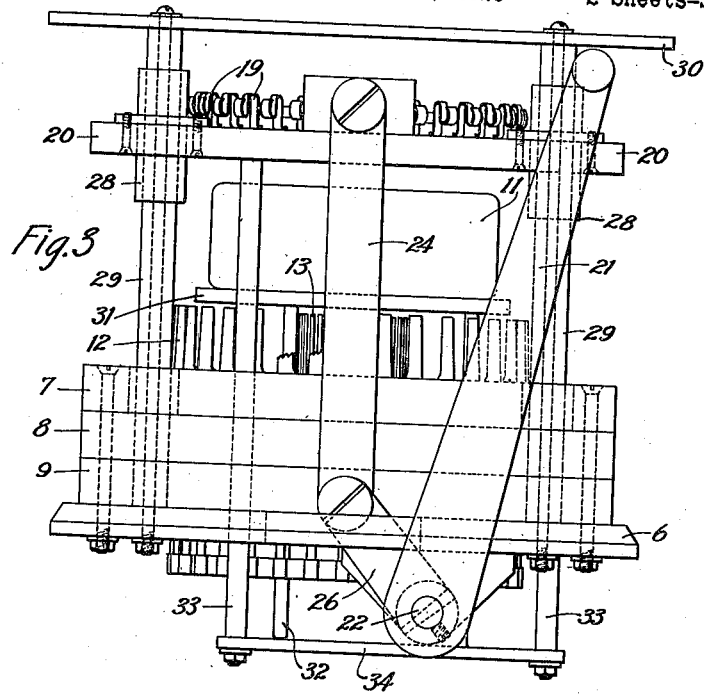
Figure 4:
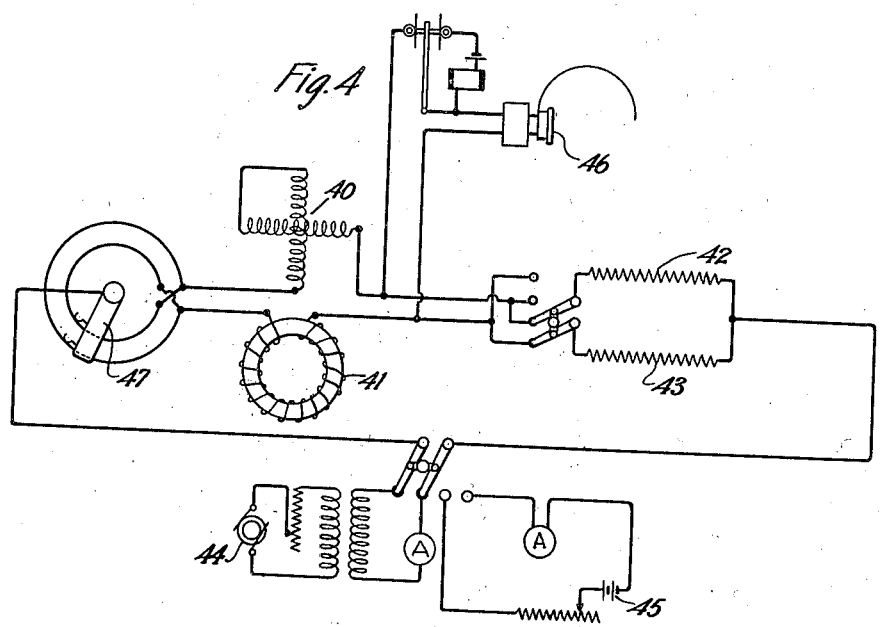

Referring to the drawings, Fig. 1 represents a top view of one form of this invention; Fig. 2 represents a sectional view of the fixture of Fig. 1 taken along the line marked 2—2; Fig. 3 is a side view of the apparatus in Fig. 1; and Fig. 4 illustrates schematically a Wheatstone bridge circuit with which the jig of this invention may be employed.

The test fixture of this invention, as disclosed in the drawing, comprises a base plate 6, on which are mounted a plurality of annular rings 7, 8 and 9 and a large central post 10, so arranged as to provide a suitable recess for a toroidal core member 11. Along opposite sides of the recess so formed are two rows 12 and 13 of contact posts. Each of these posts, if desired, may extend through the base plate 6 and be secured thereto by locking nuts, such as shown at the point 14. They also may be secured, respectively, to the annular rings and the central post 10 by screws such as shown at the points 15 and 16.

Connection between the upper ends of the contact posts 12 and 13 is made by two rows 18 and 19 of contact springs, suitably mounted on a movable plate or platform 20. The plate 20 may be moved into or out of contact with the contact posts by means of a lever 21 connected to one end of a shaft 22. Arms 23 and 24 pass through slots in the base plate 6 and are connected at one end to the plate 20, while at the other end they are pivotally connected to the cam members 25, 26, which are rigidly mounted on shaft 22. Guiding means for the movable plate 20 may be secured by attaching the plate 20 to four tubular members 28, which are adapted to slide up and down the four fixed posts 29. These fixed posts 29 may be suitably fastened at one end to the base plate 6, while at the other end they may be joined by a ring 30.

The toroidal core member 11 is preferably placed on an annular ring platform 31. The movement of the annular plate 31 may be secured by three posts 32, which extend through slots in the base plate 6 to an appreciable distance below the base plate. The movable plate 20, which supports the contact springs is also secured to the upper ends of three posts 33, which pass loosely through the annular rings 7, 8 and 9 and the base plate 6 to a considerable distance below the base plate. The lower ends of the three posts 33 are joined by a triangular shaped member 34. Whenever lever 21 is operated to raise the movable plate 20 from its lowermost position, as shown in Fig. 2, the triangular member 34 will also be raised, and after coming in contact with the lower ends of the posts 32, will also cause the platform 31 to be raised approximately the same distance as the spring contact carrying plate 20.

In Fig. 3, the platform 31 and plate 20 have been raised to such an extent by the operation of lever 21 until the platform 31 is entirely above the upper ends of the contact posts 12 and 13. With the jig in the position shown in Fig. 3, the toroidal core 11 may be readily placed on or removed from the platform 31, and with the apparatus constructed as shown in these drawings, the toroidal core 11 can be placed or removed from the left side of the apparatus, as shown in Fig. 3. The passing or removing of the toroidal core from other sides of the apparatus is prevented by one or more of the stationary or movable posts.

Corresponding spring contacts in the two rows 18 and 19 may be permanently connected together in any suitable manner, while the lower ends of the contact posts in rows 12 and 13 should be permanently connected together by contact strips 37 and in staggered relation. With the apparatus in the position shown in Fig. 2 a continuous winding of a plurality of turns will then be formed around the toroidal core 11 by the lowering of plate 20, when contact is made between each post 12 or 13 and its corresponding spring contact member 18 or 19.

The test winding so formed may be provided with suitable terminals and may be employed as shown in Fig. 4 as one arm of a Wheatstone bridge network in order to determine the magnetic characteristics of the core material, such as the alternating current loss produced thereby. The testing circuit illustrated in Fig. 4 is not a part of this invention, but is described and claimed in a copending application to William J. Shackelton, Serial No. 653,666 filed July 25, 1923, on testing systems. Reference is made to this copending application for a detailed description of the operation of the testing circuit. The testing circuit, however, may be briefly described as comprising a Wheatstone bridge, one arm of which comprises a variometer 40, a second arm of which comprises the test winding 41 produced by the fixture of this invention, a third arm of which comprises a resistance 42 and the fourth arm a resistance 43. Alternating current from the source 44 or direct current from the source 45 may be applied to two of the bridge points, while the unbalance current of the bridge may be detected by a telephone receiver 46. The variable rheostat 47 enables the resistance in arms 40 and 41 to be varied so that a balance of the bridge may be obtained by the adjustment of the rheostat 47 and the variometer 40 in the usual manner.

It is to be understood that the test fixture of this invention may possess widely different embodiments departing materially from the form specifically described above without departing in any wise from the spirit of this invention as defined in the appended claims.

The invention claimed is:

1. A test fixture comprising a platform and means for producing a continuous winding of a plurality of turns around an object placed on said platform, said means comprising a plurality of rows of metallic posts, a plurality of rows of contact members, permanent connections between each contact member of one row and a contact member of a second row, a permanent electrical connection between one end of each post of one row and a post in a second row, and means for bringing said posts and said contact members into contact to form a continuous winding of a plurality of turns around the object resting on said platform.

2. A test fixture comprising a platform adapted to support an object around which a winding is to be placed, two rows of contact posts spaced apart a sufficient distance to enclose said object, a movable plate having two rows of spring contacts arranged thereon, and means for moving said plate to cause each of said spring contacts to make electrical contact with one of said posts, each of the spring contacts in one row being permanently electrically connected to a spring contact in the other row, and each post in one row being permanently electrically connected to a post in the second row to produce a continuous winding of a plurality of turns around said object.

3. A test fixture comprising a movable platform adapted to support an object around which an electrical winding is to be placed, two rows of contact posts spaced apart a sufficient distance to enclose said object, a movable plate having two rows of contact springs arranged thereon, and unitary means for moving said platform and said plate, each of the spring contacts in one row being permanently electrically connected to a spring contact in the other row, and each post in one row being permanently electrically connected to a post in the other row to produce a continuous winding of a plurality of turns around said object when said posts and said spring contacts are in contact relation with each other.

4. A test fixture comprising a movable platform adapted to support an object around which a winding is to be placed, two rows of contact posts spaced apart a sufficient distance to enclose said object, a movable plate having two rows of spring contacts arranged thereon, guiding means for said movable plate, and unitary means for moving said plate and said platform to cause each of said spring contacts to make electrical contact with one of said posts, each of the spring contacts in one row being permanently electrically connected to a spring contact in the second row, each of said posts in one row being permanently electrically connected to a post in the other row to produce a continuous winding of a plurality of turns around said object when said spring contacts and said posts are in contact.

5. A test fixture comprising a platform adapted to support an object around which a winding is to be placed, a plate having mounted thereon two rows of contact posts spaced apart a sufficient distance to enclose said object, a second plate having mounted thereon two rows of spring contacts, and means for moving said second plate to cause each of said spring contacts to make electrical connection with one of said posts, each of the spring contacts in one row being permanently electrically connected to a spring contact in the other row, and each post in one of said rows being permanently electrically connected to a post in the other row to produce a continuous winding of a plurality of turns around said object when said posts and said contacts are in contact.

6. A test fixture comprising an annular ring shaped platform adapted to support a toroidal shaped object around which a winding is to be temporarily placed, a plate having mounted thereon two circular rows of contact posts spaced apart a sufficient distance to enclose said object, a second plate having mounted thereon two circular rows of spring contacts, and unitary means for moving said platform and one of said plates to cause each of said spring contacts to make electrical contact with one of said posts, each of the spring contacts in one row being connected to a spring contact in the other row, and each of the posts in one row being so connected to a post in the other row as to produce a continuous winding of a plurality of turns around said object when said posts and said spring contacts are in contact.

In witness whereof, I hereunto subscribe my name this 17th day of August A. D., 1923.

JAMES L. CROUCH.